S. M. MASSIE.
Corn-Shelling Machines.
No. 213,120. Patented Mar. 11, 1879.
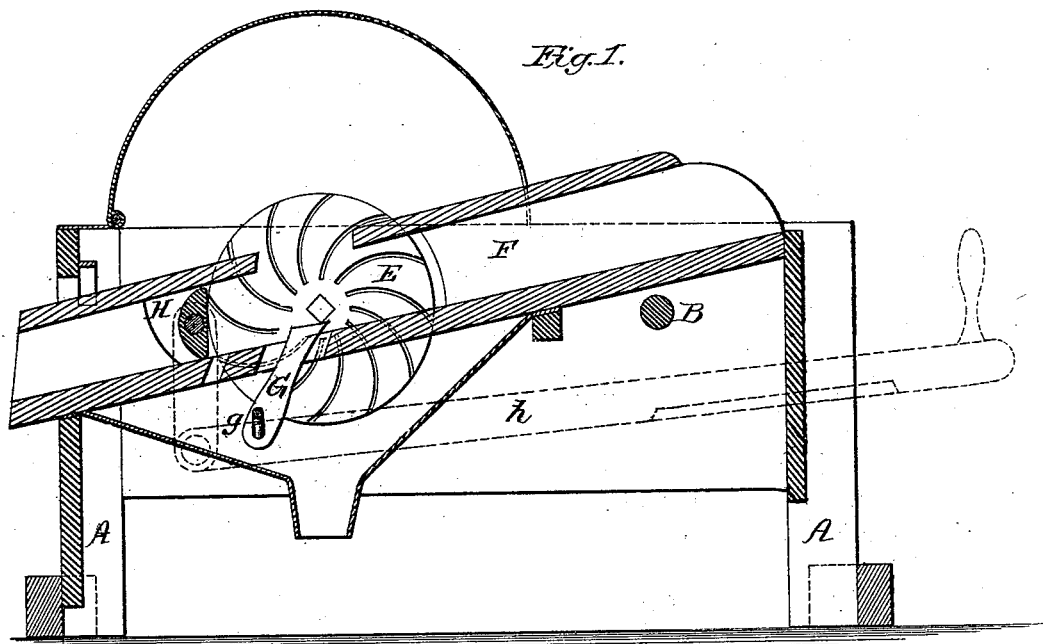
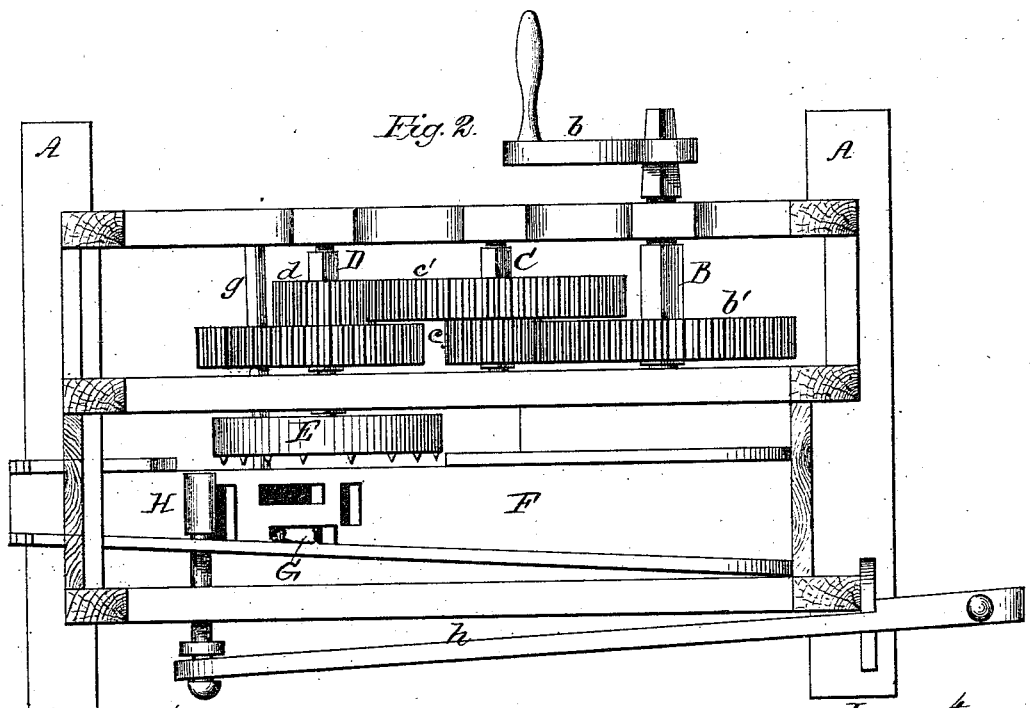

UNITED STATES PATENT OFFICE.

SEBRON M. MASSIE, OF LEICESTER, NORTH CAROLINA.

IMPROVEMENT IN CORN-SHELLING MACHINES.

Specification forming part of Letters Patent No. 213,120, dated March 11, 1879; application filed January 15, 1879.

*To all whom it may concern:*

Be it known that I, SEBRON M. MASSIE, of Leicester, in the county of Buncombe and State of North Carolina, have invented a novel and useful Improvement in Corn-Shelling Machines, of which the following is a full, clear, and exact description, reference being had to the accompanying sheet of drawings, in which—

Figure 1 is a longitudinal sectional elevation, and Fig. 2 a plan view, of a machine embodying my improvements.

A is a stout frame, of suitable shape, constructed in any usual or preferred manner, on which are journaled the shafts B C D.

The driving-shaft B, to which is imparted motion through crank $b$, or by any other suitable means, carries cogged wheel $b'$, gearing with small pinion $c$ on shaft C, which, by this, transmits accelerated motion, through cogged wheel $c'$ and pinion $d$ on shaft D, to the shelling-disk E, mounted on the end of said shaft. This disk is provided on its outer face with teeth, ribs, grooves, or other shelling devices, as shown in Fig. 1, preferably arranged on curved lines, starting radially from or near the center, for the purpose of aiding the forward progress of the ear of corn while being shelled. F is the shelling-throat, arranged in an inclined position across the face of the shelling-wheel, as shown, and lessening in width and depth from its upper or receiving end to its lower or discharging end. It is cut away on one side to correspond with the shelling-wheel, which is set into the opening, and thus forms part of the throat. The ear is held against the wheel by the narrowness of the throat, and the peculiar arrangement of the teeth or ribs causes the ear to be slowly propelled downward.

I provide several perforations in the bottom of the throat for the escape of the shelled corn; but on the side of the throat opposite to the shelling-wheel is cut a slot through the bottom, through which a push-bar, G, is caused to move up and down more or less rapidly, thrusting the ear on one side, and thus causing it to rotate on its own axis intermittently and expose all sides successively to the action of the shelling-wheel.

The push-bar is operated by a crank-shaft, $g$, on which it is mounted, said shaft being rotated by suitable gear-connection with shaft D, or in any other preferred way.

A valve, H, is located in the throat just below the shelling-wheel, and serves to keep the ear from escaping until shelled. It may be pivoted, as shown, and operated by a crank-arm and bar, $h$, as clearly shown.

I claim as my invention—

1. The combination of the shelling-wheel, the throat, and the pivoted valve below the shelling-wheel and within the throat, substantially as set forth.

2. The combination of the shelling-wheel, the throat, and the reciprocating push-bar, substantially as set forth.

3. The combination of the shelling-wheel, the throat slotted in the bottom opposite the shelling-wheel, and the reciprocating push-bar, substantially as set forth.

In witness whereof I hereunto set my hand, in the presence of two witnesses, this 17th day of December, 1878.

SEBRON M. MASSIE.

Witnesses:
JAMES M. STEVENS,
J. W. ROBERTSON.